(12) United States Patent
Davis

(10) Patent No.: US 12,381,388 B2
(45) Date of Patent: Aug. 5, 2025

(54) AUTOMATIC SMART JUMP START BATTERY PACKS AND RESERVE POWER SUPPLY SYSTEMS INCLUDING THE SAME

(71) Applicant: Cattron North America, Inc., Warren, OH (US)

(72) Inventor: Brett Allen Davis, Roswell, GA (US)

(73) Assignee: Cattron North America, Inc., Warren, OH (US)

( * ) Notice: Subject to any disclaimer, the term of this patent is extended or adjusted under 35 U.S.C. 154(b) by 0 days.

(21) Appl. No.: 18/765,806

(22) Filed: Jul. 8, 2024

(65) Prior Publication Data

US 2024/0364135 A1 Oct. 31, 2024

Related U.S. Application Data

(63) Continuation-in-part of application No. 18/207,576, filed on Jun. 8, 2023, now Pat. No. 12,283,844, which is a continuation of application No. 17/379,048, filed on Jul. 19, 2021, now Pat. No. 11,677,267, which is a continuation of application No. 16/839,376, filed on Apr. 3, 2020, now Pat. No. 11,070,080.

(60) Provisional application No. 63/525,573, filed on Jul. 7, 2023.

(51) Int. Cl.
*H02J 1/10* (2006.01)
*H02J 7/34* (2006.01)

(52) U.S. Cl.
CPC .............. *H02J 1/122* (2020.01); *H02J 7/342* (2020.01)

(58) Field of Classification Search
CPC ................................. H02J 1/122; H02J 7/342
See application file for complete search history.

(56) References Cited

U.S. PATENT DOCUMENTS

| | | |
|---|---|---|
| 5,204,610 A | 4/1993 | Pierson et al. |
| 7,545,118 B2 | 6/2009 | Kim |
| 9,802,562 B2 | 10/2017 | Yasunori et al. |
| 9,812,878 B1 | 11/2017 | Stieber et al. |
| 11,677,267 B2 | 6/2023 | Davis et al. |
| 2002/0008495 A1 | 1/2002 | Dougherty et al. |

(Continued)

FOREIGN PATENT DOCUMENTS

EP 1832464 A3 10/2008

OTHER PUBLICATIONS

International Search Report PCT/US2021/025493, dated Jul. 18, 2021.

(Continued)

*Primary Examiner* — Daniel Cavallari
(74) *Attorney, Agent, or Firm* — Harness, Dickey & Pierce, P.L.C.; Anthony G. Fussner

(57) ABSTRACT

The present disclosure generally relates to automatic smart jump start battery packs (broadly, reserve power supply systems) for machinery. In exemplary embodiments, a battery pack is configured (e.g., includes a microcontroller, etc.) to automatically detect when machinery (e.g., a water pumping system, etc.) needs a jump start from the battery pack. For example, a microcontroller (e.g., broadly, a controller, etc.) within the battery pack may be configured to determine when the machinery's main battery does not have a sufficient charge to operate an electric starter motor of the machinery, e.g., when a main battery signal from a voltage sensor falls below a predetermined level, etc.

19 Claims, 5 Drawing Sheets

(56) References Cited

U.S. PATENT DOCUMENTS

| | | |
|---|---|---|
| 2011/0127830 A1 | 6/2011 | Harding |
| 2013/0106357 A1 | 5/2013 | Girard et al. |
| 2013/0179719 A1 | 7/2013 | Tseng et al. |
| 2014/0055094 A1 | 2/2014 | Takagi et al. |
| 2015/0180257 A1 | 6/2015 | Snyder et al. |
| 2015/0303695 A1 | 10/2015 | Perry et al. |
| 2016/0226269 A1 | 8/2016 | Hwang et al. |
| 2018/0301919 A1* | 10/2018 | Rumbaugh ........... H02J 7/0042 |
| 2023/0318353 A1 | 10/2023 | Davis et al. |

OTHER PUBLICATIONS

Australian Examination Report for AU2021246134 that claims priority to the instant application; dated Oct. 31, 2023; 3 pages.
Extended European Search report from EP21781362.5, dated May 6, 2024.

* cited by examiner

- Microcontroller within the jump start battery pack monitors the main battery's voltage looking for a large negative change in voltage over a short time (*e.g.*, <5ms, *etc.*) to indicate a beginning of a starting event

- Once the large negative charge in voltage over the short period of time is detected, the main battery voltage is monitored looking for a large positive change in voltage over a short time (*e.g.*, 5 to 100ms, *etc.*) to indicate the end of a starting event.

- Once detected, the microcontroller within the jump start battery pack will compare the ending voltage with the original voltage.
    - If ending voltage is near (*e.g.*, 0 to +1 volt, *etc.*) or lower than the original voltage, a failed cranking attempt is declared.
    - If the ending voltage is within a predetermined level (*e.g.*, < + 1 volt, *etc.*) of the original voltage, a successful cranking attempt is declared.

- If a successful cranking attempt is detected, the microcontroller within the jump start battery pack checks to see if the jump start battery pack needs charging and does so if needed.

- If a failed cranking attempt is detected, the microcontroller within the jump start battery pack electrically connects the battery pack's high-current output in parallel with the main battery and waits for another cranking attempt. The battery pack will timeout and disconnect the battery pack's high-current output if another attempt is not made within a time period (*e.g.*, within 30 seconds, *etc.*)

- The process repeats for subsequent cranking attempts until either:
        A Timeout Occurs
        A Successful Cranking Attempt is Detected
        The Jump Start Battery is Depleted

Figure 6

AUTOMATIC SMART JUMP START BATTERY PACKS AND RESERVE POWER SUPPLY SYSTEMS INCLUDING THE SAME

CROSS-REFERENCE TO RELATED APPLICATIONS

This application claims priority to and the benefit of U.S. Provisional Patent Application No. 63/525,573 filed Jul. 7, 2023.

This application is continuation-in-part of U.S. patent application Ser. No. 18/207,576 filed Jun. 8, 2023, which published as U.S. Patent Application Publication US2023/0318353 on Oct. 5, 2023.

U.S. patent application Ser. No. 18/207,576 is a continuation of U.S. patent application Ser. No. 17/379,048 filed Jul. 19, 2021, which published as U.S. Patent Application Publication US2021/0344220 on Nov. 4, 2021 and granted as U.S. Pat. No. 11,677,267 on Jun. 13, 2023.

U.S. patent application Ser. No. 17/379,048 is a continuation of U.S. patent application Ser. No. 16/839,376 filed Apr. 3, 2020, which granted as U.S. Pat. No. 11,070,080 on Jul. 20, 2021.

The entire disclosures each of the above applications are incorporated herein by reference.

FIELD

The present disclosure generally relates to automatic smart jump start battery packs (broadly, reserve power supply systems) for machinery.

BACKGROUND

This section provides background information related to the present disclosure which is not necessarily prior art.

As electronic communication methods and systems continue to improve and become more cost effective, so too does the desirability and practicality of decentralizing functions closer to their point of impact.

In a municipal water supply system, for example, it is beneficial for water pumps to be strategically located in the system where they can operate most efficiently. It would be counter-productive to efficiency if all water pumps within the system were located at a central pumping site.

While a central pumping site allows for more efficient control and monitoring of all pumps, such efficiency is lost many times over due to the need to run a multiplicity of water lines over much longer distances if each pump is located at its maximum point of impact with respect to efficiently moving water to an end use location. Moreover, centrally located water pumps requires pumps with more capacity and size in order to overcome the additive increase in fluid resistance and friction in longer pipe runs.

In other situations, safety concerns, convenience and avoidance of noise require that machinery be located remotely. In many such installations, the machinery is required to operate independently.

While the benefits of remotely locating certain machinery, such as water pumps, are clear, the problem remains as to how such machinery can be operated as autonomously as possible with only minimal or no remote monitoring and/or control.

DRAWINGS

The drawings described herein are for illustrative purposes only of selected embodiments and not all possible implementations and are not intended to limit the scope of the present disclosure.

FIG. 6 illustrates an exemplary method of operation for an automatic smart jump start battery pack (broadly, a reserve power supply system) including a microcontroller (broadly, a controller) and configured for detecting failed and successful cranking attempts according to an exemplary embodiment of the present disclosure.

DETAILED DESCRIPTION

Example embodiments will now be described more fully with reference to the accompanying drawings.

Figure 1:
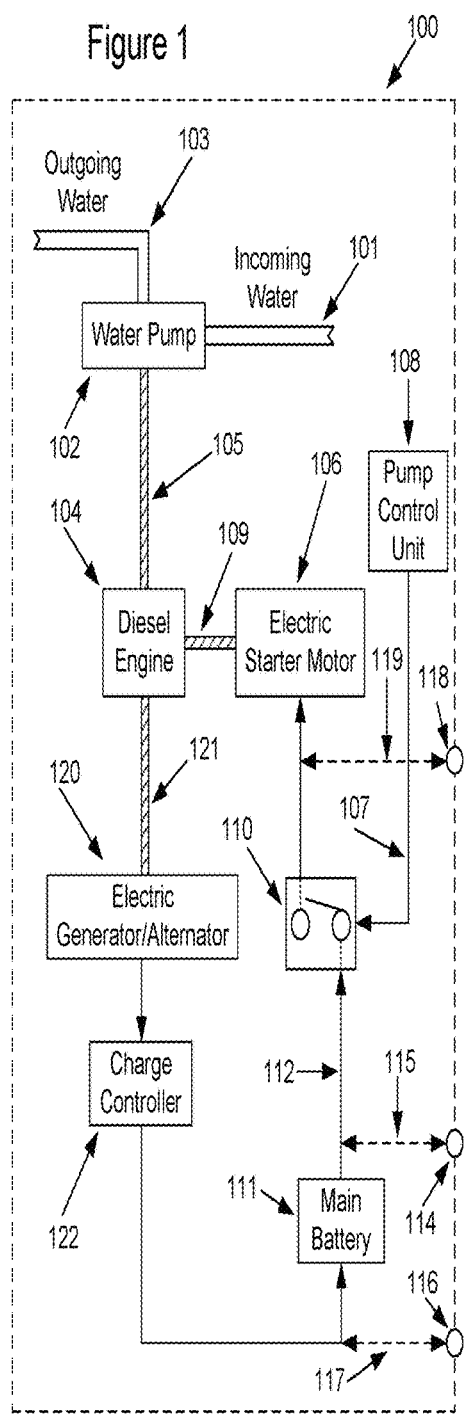
FIG. 1 is a mechanical layout of a water pumping system to which may be attached a reserve power supply system according to exemplary embodiments of the present disclosure.

FIG. 1 is block diagram which illustrates one embodiment of water pumping system 100 as known in the art to which may be attached an exemplary embodiment of a reserve power supply system disclosed herein (e.g., reserve power supply system 200 (FIG. 2), an automatic smart jump start battery pack, etc.). The water pumping system 100 shown in FIG. 1 is by way of example only as exemplary embodiments disclosed herein are not limited to use only with only the water pumping system 100 shown in FIG. 1. The water pumping system 100 was chosen to illustrate use of exemplary embodiments of the reserve power supply systems disclosed herein (e.g., reserve power supply system 200 (FIG. 2), an automatic smart jump start battery pack, etc.) because water pumping systems are often remotely located. The exemplary embodiments of the reserve power supply systems disclosed herein may be used with other systems and machinery as well.

With continued reference to FIG. 1, water pumping system 100 includes a Water Inlet 101 and an outgoing Water Outlet 103. Water Inlet 101 allows water to enter Water Pump 102. Water Outlet 103 allows water from Pump 102 to be sent to its point of use.

Water Pump 102 is driven by Diesel Engine 104 via Drive Shaft 105 as is known in the art.

As is the case with the typical diesel engine, Diesel Engine 104 is started by Electric Starter Motor 106 in response to Starter Motor Control Signal 107 from Pump Control Unit 108.

Starter Relay 110 is controlled by Starter Motor Control Signal 107 and connects Main Battery 111 to Starter Motor 106 in order to start Diesel Engine 104 when Water Pump 102 is required to operate.

In conventional remotely located machinery, such as the Water Pumping System 100 illustrated in FIG. 1, Main Battery 111 is connected directly to Relay 110 as indicated by line 112.

As is the case with most electrically operated machinery, there are a number of naturally occurring nodes that allow for attachment of accessory electrical devices, such as an exemplary embodiment of a reserve power supply system disclosed herein (e.g., reserve power supply system 200 (FIG. 2), an automatic smart jump start battery pack, etc.). Such nodes include node 114 as illustrated by dashed line 115, node 116 as illustrated by dashed line 117, and node 118 as illustrated by dashed line 119.

Nodes 114, 116, and 118, as well as additional nodes, may also be exposed to accessory devices through engine control units as is known in the art.

Diesel Engine 104 also drives Electric Generator/Alternator 120 via Drive Shaft 121. Generator/Alternator 120 is used to charge Main Battery 111 through Charge Controller 122. The charge current from Charger Control 122 may also be made available through node 116.

Figure 2:
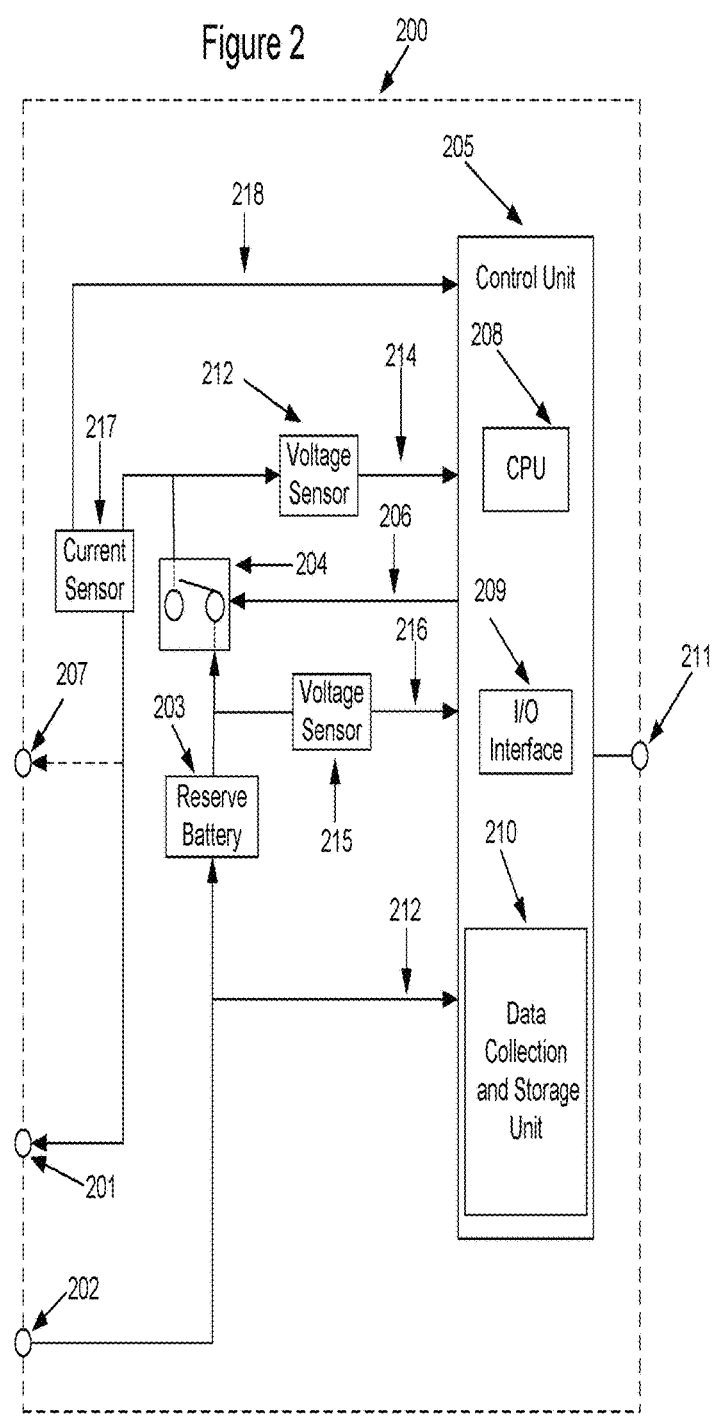
FIG. 2 is a block diagram of a reserve power supply system according to an exemplary embodiment of the present disclosure.

FIG. 2 illustrates a reserve power supply system 200 according to an exemplary embodiment of the present disclosure. System 200 can be coupled to, for example, Water Pump System 100 shown in FIG. 1, via nodes 201 and 202 to corresponding nodes 114 and 116 of the Water Pump System 100.

As shown in FIG. 2, the reserve power supply system 200 includes Reserve Battery 203 which is coupled to Node 201 through Relay 204. Relay 204 is controlled by Control Unit 205 via Relay Control Signal 206. Thus, when Relay 204 is activated by Relay Control Signal 206, Reserve Battery 203 is placed in electrical parallel with Main Battery 111 shown in FIG. 1 via Nodes 114 and 201.

In an alternative embodiment, Reserve Battery 203 may be coupled directly to Electric Starter Motor 106 via Nodes 118 and 207 when desirable. For example, should Main Battery 111 develop an internal short circuit, coupling Reserve Battery 203 directly to Starter Motor 106 may be more desirable than placing Reserve Battery 203 in parallel with Main Battery 111.

Control Unit 205 includes a Central Processing Unit (CPU) 208, I/O Interface 209, and Data Collection and Storage Unit 210.

Control Unit 205 is coupled to communications node 211, which allows Control Unit 215 to communicate to remote facilities.

Voltage Sensor 212 measures the voltage drop across Main Battery 111 and provides Main Battery Voltage Signal 214 to Control Unit 205. Voltage Sensor 215 measures the voltage drop across Reserve Battery 203 and provides Reserve Battery Voltage Signal 216 to Control Unit 205.

As further shown in FIG. 2, Nodes 116 and 202 allow current from Charge Controller 122. Alternatively, Reserve Battery 203 may be coupled in parallel with Main Battery 111 for an extended period of time in order for Reserve Battery 203 to be charged indirectly.

Figure 3:
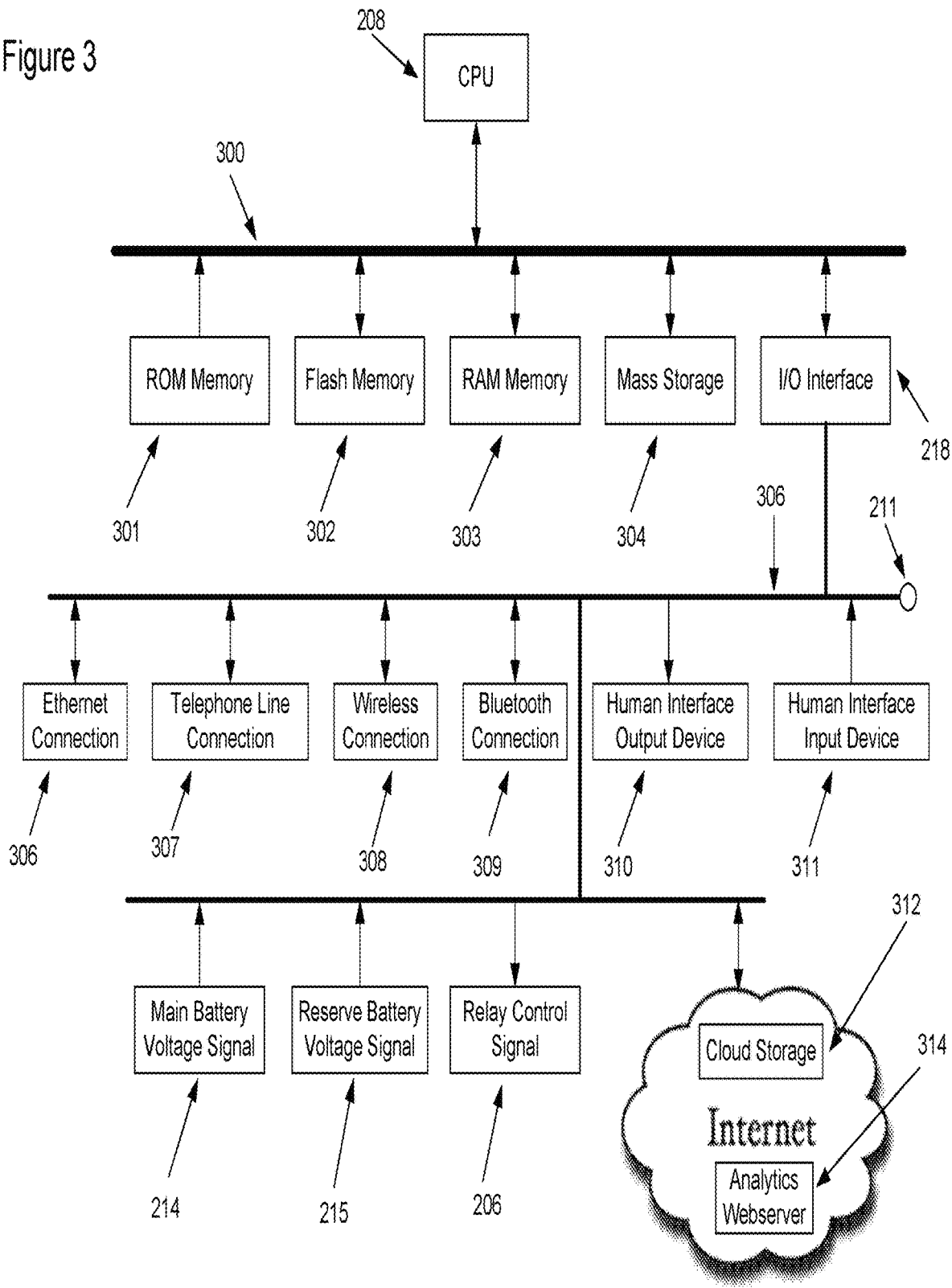
FIG. 3 is a block diagram of the control unit illustrated in FIG. 2.
Figure 4:
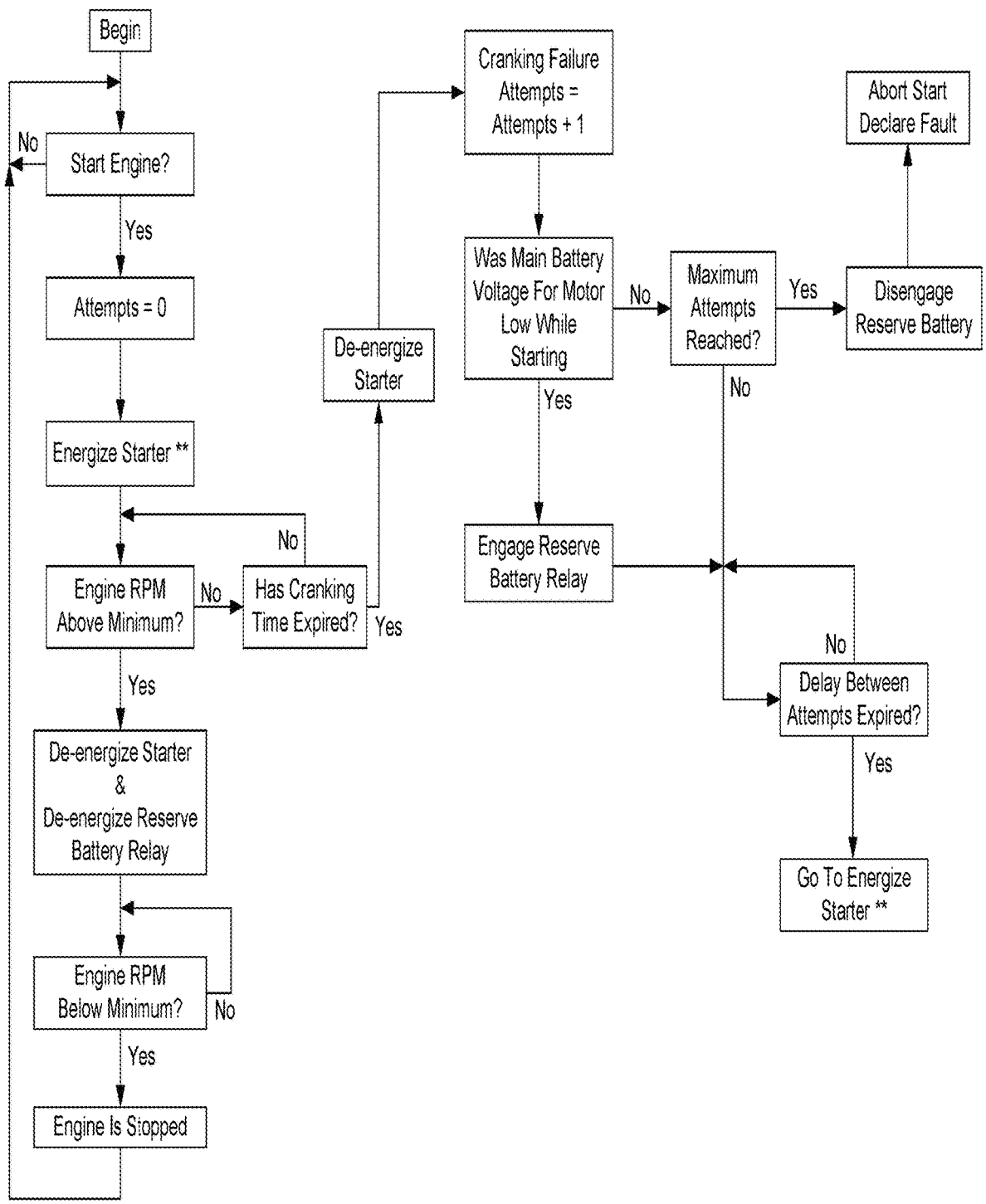
FIG. 4 is a flow chart illustrating an exemplary method of operation for the reserve power supply system shown in FIGS. 2 and 3 according to an exemplary embodiment of the present disclosure.

FIG. 3 is a more detailed block diagram of Control Unit 205, including some of its interstitial elements.

As illustrated in FIG. 3, Control Unit 205 includes aforementioned CPU 208, which is used to execute computer software instructions as is known in the art. CPU 208 is coupled, via buss 300, to ROM Memory 301, Flash Memory 302, RAM Memory 303, Mass Storage 304 and aforementioned I/O Interface 209 as also shown in FIG. 2.

ROM Memory 301 and Flash Memory 302 may be used to store computer software instructions for execution by CPU 217. RAM memory 303 may also be used for storing computer software instructions, and especially for storing information that is only needed for a short period of time. Mass Storage 304 is used for longer and larger data storage needs as required by aforementioned Data Collection and Storage Unit 210 as shown in FIG. 2.

The underlying firmware or software which CPU 208 executes may be updated from time to time in order to correct programming errors or to add additional features to the system. Such upgrades can be accomplished locally at the physical location of Control Unit 205 via Human Interface Output Device 310 and Human Interface Input Device 311, or remotely via communication connections 306-309 shown in FIG. 3.

Data Collection and Storage Unit 210 provides a data logging function of the operation of the system which can be stored in Ram memory 303 as well as Mass Storage 304 for later retrieval over an external data communication port as discussed below.

The logging data may also be stored in a remote database, such as Cloud Storage 312 on the Internet. The logging data may also be analyzed and modeled with analytic software such as might be resident on a Webserver 314 also on the Internet. Such analysis and modeling can be used to gain insight regarding the state and operating condition of the machinery, such as Water Pump System 100 illustrated in FIG. 1 to which the exemplary embodiment of the reserve power supply system is connected.

CPU 208 is also coupled to a number of peripheral interface devices via I/O Interface 210 and its own buss 306.

Ethernet Connection 306, Telephone Line Connection 307, Wireless Connection and Bluetooth Connection 309 allow Control Unit 205 (FIG. 2) to communicate with remotely located devices and systems, for example the Internet and Data Store 312 and Analytics Webserver 314.

Bluetooth 309 enables Control Unit 205 to connect to and communicate with Bluetooth devices such as a smartphone. An app running on a smartphone may be used to receive and display all or a predetermined subset of the logging data from Data Collection and Storage Unit 210. The app may also perform certain control functions, such as commanding main battery Relay 110 and reserve battery Relay 204 to switch from Main Battery 111 and Reserve Battery 203 to be coupled to Electric Starter Motor 106 in different ways for different purposes. Other control functions are possible as well.

A smart phone may also be used to connect to Analytics Webserver 314 for the same purpose.

Human Interface Output Device 310 and Human Interface Input Device 311 allow a human to communicate with Control Unit 216 directly. Thus, the Output Device 310 may include a visual display, status and warning lights and alarms. Input Device 311 may include settable switches, push buttons and a keyboard. Input Device 311 may also include a pointing device for use with a visual display for making onscreen selections and/or a rotary linear selection device for making user selections. Other input devices may be used as well.

Control Unit 205 determines that Main Battery 111 does not have a sufficient charge to operate Electric Starter Motor 106 when Main Battery Signal 214 from Voltage Sensor 212 falls below a predetermine level. When that condition occurs, Control Unit 205 generates Relay Control Signal 206 which causes Relay 204 (FIG. 2) to be placed in parallel with Main Battery 111. As mentioned above, other switching arrangements of Relay 110 and 204 may be accomplished as well.

As further shown in FIG. 2, Current Sensor 217 provides a Current Signal 218 to Control Unit 205.

The software and firmware resident in ROM 301, Flash Memory and/or Ram Memory 303 may also include maintenance and diagnostic functions. Sensor Signals 214, 216 and 218 can be analyzed by Control Unit 208 to gain insights such as less than expected current flow can indicate:
1. A problem with the starter motor;
2. Main Battery 111 is beginning to discharge more rapidly than expected;
3. Electric Generator/Alternator 120 or Charge Controller 122 not providing sufficient current to recharge Main Battery 111 and/or Reserve Battery 203; and
4. An open coil windings in the starter motor.

Greater than expected current flow can indicate:
1. That the starter motor is beginning to fail due to current leakage through its internal insulation;
2. Internal shorts developing within the starter motor coils; and
3. A mechanical binding somewhere in the starter motor power train causing the starter motor to work hard and draw more current.

As part of the date analytics referred to with respect to Analytics Webserver 314 in FIG. 3, current and voltage data can be logged and analyzed over time and used to predicted failure and provide maintenance alerts.

Figure 5:
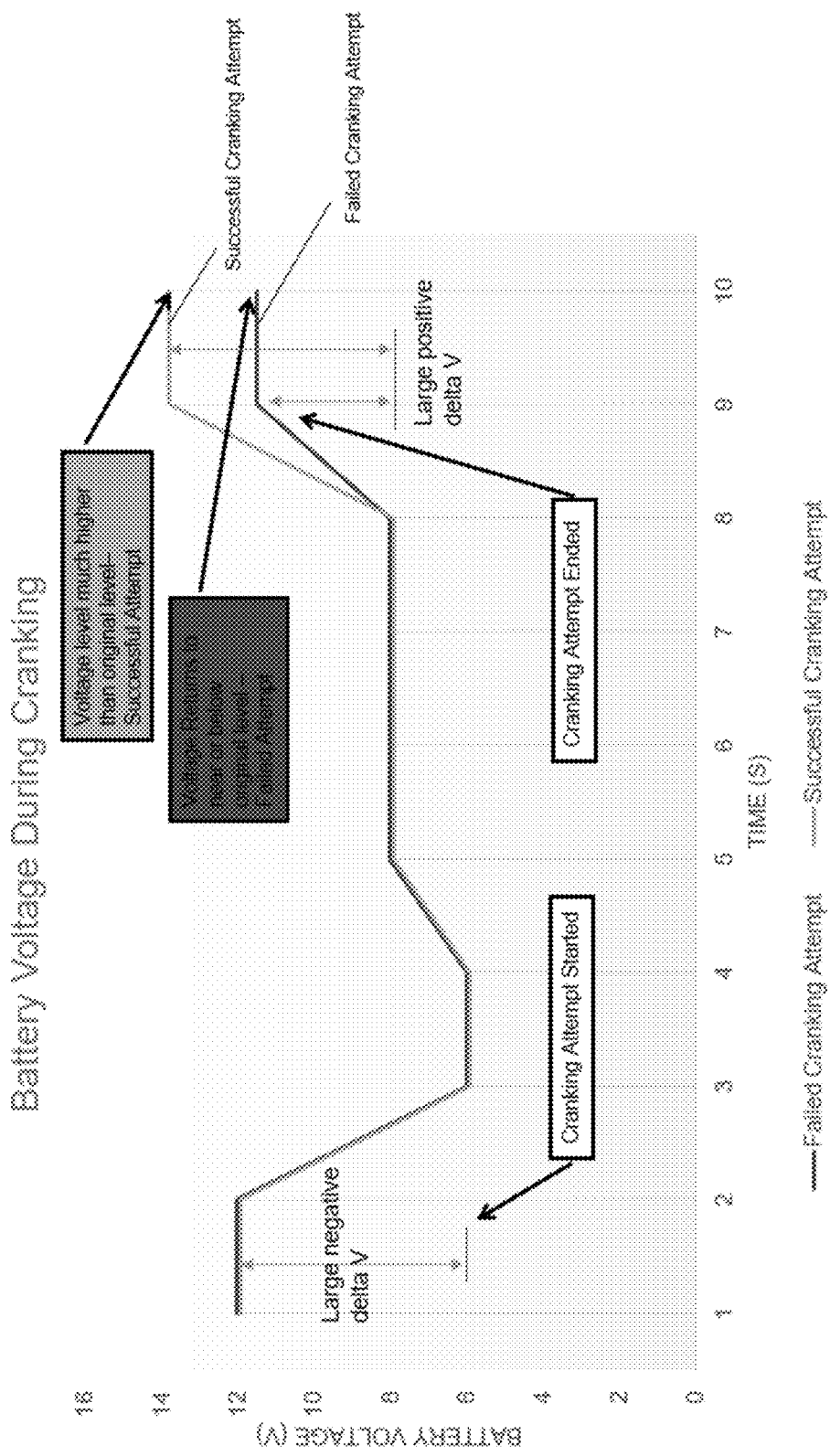
FIG. 5 is a line graph of battery voltage versus time during detection of failed and successful cranking attempts by an automatic smart jump start battery pack (broadly, a reserve power supply system) according to an exemplary embodiment of the present disclosure.

FIG. 5 is a line graph of battery voltage versus time during detection of failed and successful cranking attempts by an automatic smart jump start battery pack (broadly, a reserve power supply system) according to an exemplary embodiment of the present disclosure. In exemplary embodiments, a battery pack is configured (e.g., includes a microcontroller, etc.) to automatically detect when machinery (e.g., a water pumping system, etc.) needs a jump start from the battery pack. For example, a microcontroller (e.g., broadly, a controller, etc.) within the battery pack itself may be configured to determine when the machinery's main battery does not have a sufficient charge to operate an electric starter motor of the machinery, e.g., when a main battery signal from a voltage sensor falls below a predetermined level, etc. Advantageously, exemplary embodiments of the automatic smart jump start battery packs disclosed herein may eliminate the need to have a separate control unit (e.g., control unit 205 (FIGS. 2 and 3), etc.) to detect when the machinery needs a jump start.

In exemplary embodiments, the reserve power supply system 200 shown in FIG. 2 may be replaced by an automatic smart jump start battery pack. In such exemplary embodiments, the battery pack is configured to be connected to the water pump system 100 via nodes via nodes 201 and 202 of the battery pack to corresponding nodes 114 and 116 of the water pump system 100. Except for the separate control unit 205, an exemplary embodiment of the automatic smart jump start battery pack may include one or more components similar to or substantially identical to the corresponding components of the reserve power supply system 200. For example, the automatic smart jump start battery pack may include a reserve battery 203, which is coupled to node 201 through relay 204. Relay 204 may be controlled via a microcontroller (broadly, a controller) within the automatic smart jump start battery pack via relay control signal 206. Thus, when relay 204 is activated by relay control signal 206, the reserve battery 203 of the battery pack may be placed in electrical parallel with the main battery 111 of the water pump system 100 shown in FIG. 1 via nodes 114 and 201. The battery pack's microcontroller may monitor, via voltage sensor 212, the voltage drop across the main battery 111. The battery pack's microcontroller may monitor, via voltage sensor 216, the voltage drop across reserve battery 203 of the battery pack.

FIG. 6 illustrates an exemplary process or method of operation for an automatic smart jump start battery pack (broadly, a reserve power supply system) including a microcontroller (broadly, a controller) and configured for detecting failed and successful cranking attempts according to an exemplary embodiment of the present disclosure.

As shown in FIG. 6, a microcontroller within the jump start battery pack monitors the main battery's voltage looking for a large negative change in voltage over a short time (e.g., <5 ms, etc.) to indicate a beginning of a starting/cranking event. After the microcontroller within the jump start battery pack detects the large negative charge in voltage over the short period of time indicating the beginning of the starting/cranking event, the microcontroller monitors the main battery voltage looking for a large positive change in voltage over a short time (e.g., 5 to 100 ms, etc.) indicative of the end of a starting/cranking event.

After the microcontroller detects the large positive change in voltage over the short time indicating the end of a starting/cranking event, the microcontroller within the jump start battery pack compares the ending voltage with the original voltage. If the ending voltage is near (e.g., 0 to +1 volt, etc.) or lower than the original voltage, a failed cranking attempt is declared. If the ending voltage is within a predetermined range or level (e.g., <+1 volt, etc.) of the original voltage, a successful cranking attempt is declared.

If a successful cranking attempt is detected, the microcontroller within the jump start battery pack checks to see if the jump start battery pack needs charging and does so if needed.

If a failed cranking attempt is detected, the microcontroller within the jump start battery pack electrically connects the battery pack's high-current output in parallel with the main battery and waits for another cranking attempt. The battery pack will timeout and disconnect the battery pack's high-current output if another attempt is not made within a time period (e.g., within 30 seconds, etc.).

The process described above and shown in FIG. 6 will be repeated for subsequent cranking attempts until either: (1) a Timeout Occurs; (2) a Successful Cranking Attempt is Detected; or (3) the Jump Start Battery is Depleted.

Exemplary embodiments may include one or more processors and memory coupled to (and in communication with) the one or more processors. A processor may include one or more processing units (e.g., in a multi-core configuration, etc.) such as, and without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

It should be appreciated that the functions described herein, in some embodiments, may be described in computer executable instructions stored on a computer readable media, and executable by at least one processor. The computer readable media is a non-transitory computer readable storage medium. By way of example, and not limitation, such computer-readable media can include dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, other optical disk storage, magnetic disk storage or other magnetic storage devices, any other type of volatile or nonvolatile physical or tangible computer-readable media, or other medium that can be used to carry or store desired program code in the form of instructions or data structures and that can be accessed by a computer. Combinations of the above should also be included within the scope of computer-readable media.

Computer-executable instructions may be stored in the memory for execution by a processor to particularly cause the processor to perform one or more of the functions described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the functions or processes described herein.

It should also be appreciated that one or more aspects of the present disclosure transform a general-purpose computing device into a special-purpose computing device when configured to perform the functions, methods, and/or processes described herein.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

None of the elements recited in the claims are intended to be a means-plus-function element within the meaning of 35 U.S.C. § 112 (f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
monitoring, via a controller within a jump start battery pack, a voltage of a main battery to detect a large negative change in voltage over a short time that is indicative of a beginning of a starting/cranking event;
after detecting the large negative charge in voltage over the short period of time that is indicative of the starting/cranking event, monitoring, via the controller within the jump start battery pack, the voltage of the main battery to detect a large positive change in voltage over a short time that is indicative of the end of the starting/cranking event;
after detecting the large positive change in voltage over the short time that is indicative of the end of the starting/cranking event, comparing, via the controller within the jump start battery pack, the ending voltage with the original voltage;
if the ending voltage is within a first predetermined amount or lower than the original voltage, declaring a failed cranking attempt;
if the ending voltage is within a second predetermined amount of the original voltage, declaring a successful cranking attempt;
if a successful cranking attempt is detected, determining, via the controller within the jump start battery pack, if the jump start battery pack needs charging and thereafter charging the jump start battery back if needed; and
if a failed cranking attempt is detected, electrically connecting, via the controller within the jump start battery pack, a high-current output of the jump start battery pack in parallel with the main battery and waiting for another cranking attempt.

2. The method of claim 1, wherein the method includes timing out the jump start battery pack and disconnecting the high current-output of the jump start battery pack if another cranking attempt is not made within a time period.

3. The method of claim 1, wherein the method is repeated for subsequent cranking attempts until either: (1) a Timeout Occurs; (2) a Successful Cranking Attempt is Detected; or (3) the Jump Start Battery is Depleted.

4. The method of claim 1, wherein the controller comprises a microcontroller.

5. The method of claim 1, wherein the main battery comprises a main battery of a water pump system.

6. A jump start battery pack configured to perform the method of claim 1.

7. An automatic smart jump start battery pack configured to perform the method of claim 1.

8. A jump start battery pack including a controller configured to be operable for:
monitoring a voltage of a main battery to detect a large negative change in voltage over a short time that is indicative of a beginning of a starting/cranking event;
after detecting the large negative charge in voltage over the short period of time that is indicative of the starting/cranking event, monitoring the voltage of the main battery to detect a large positive change in voltage over a short time that is indicative of the end of the starting/cranking event;
after detecting the large positive change in voltage over the short time that is indicative of the end of the starting/cranking event, comparing the ending voltage with the original voltage;
if the ending voltage is within a first predetermined amount or lower than the original voltage, declaring a failed cranking attempt;
if the ending voltage is within a second predetermined amount of the original voltage, declaring a successful cranking attempt;
if a successful cranking attempt is detected, determining if the jump start battery pack needs charging and thereafter charging the jump start battery back if needed; and
if a failed cranking attempt is detected, electrically connecting a high-current output of the jump start battery pack in parallel with the main battery and waiting for another cranking attempt.

9. The jump start battery pack of claim 8, wherein the controller is configured to be operable for timing out the jump start battery pack and disconnecting the high current-output of the jump start battery pack if another cranking attempt is not made within a time period.

10. The jump start battery pack of claim 8, wherein the controller is configured to be operable for performing repeatedly for subsequent cranking attempts until either: (1) a Timeout Occurs; (2) a Successful Cranking Attempt is Detected; or (3) the Jump Start Battery is Depleted.

11. The jump start battery pack of claim 8, wherein the controller comprises a microcontroller.

12. The jump start battery pack of claim 8, wherein the main battery comprises a main battery of a water pump system.

13. The jump start battery pack of claim 8, wherein the jump start battery pack is an automatic smart jump start battery pack.

14. A non-transitory computer-readable storage media including executable instructions, that when executed by at least one processor, cause a controller of a jump start battery pack to be operable for:
monitoring a voltage of a main battery to detect a large negative change in voltage over a short time that is indicative of a beginning of a starting/cranking event;
after detecting the large negative charge in voltage over the short period of time that is indicative of the starting/cranking event, monitoring the voltage of the main battery to detect a large positive change in voltage over a short time that is indicative of the end of the starting/cranking event;
after detecting the large positive change in voltage over the short time that is indicative of the end of the starting/cranking event, comparing the ending voltage with the original voltage;
if the ending voltage is within a first predetermined amount or lower than the original voltage, declaring a failed cranking attempt;
if the ending voltage is within a second predetermined amount of the original voltage, declaring a successful cranking attempt;
if a successful cranking attempt is detected, determining if the jump start battery pack needs charging and thereafter charging the jump start battery back if needed; and
if a failed cranking attempt is detected, electrically connecting a high-current output of the jump start battery pack in parallel with the main battery and waiting for another cranking attempt.

15. The non-transitory computer-readable storage media of claim 14, wherein the executable instructions include executable instructions, that when executed by the at least one processor, cause the controller to be operable for timing out the jump start battery pack and disconnecting the high current-output of the jump start battery pack if another cranking attempt is not made within a time period.

16. The non-transitory computer-readable storage media of claim 14, wherein the executable instructions include executable instructions, that when executed by the at least one processor, cause the controller to be operable for performing repeatedly for subsequent cranking attempts until either: (1) a Timeout Occurs; (2) a Successful Cranking Attempt is Detected; or (3) the Jump Start Battery is Depleted.

17. The non-transitory computer-readable storage media of claim 14, wherein the main battery comprises a main battery of a water pump system.

18. A microcontroller within a jump start battery pack comprising the non-transitory computer-readable storage media of claim 14.

19. An automatic smart jump start battery pack comprising the non-transitory computer-readable storage media of claim 14.

* * * * *